US011460006B2

(12) United States Patent
Kaur et al.

(10) Patent No.: US 11,460,006 B2
(45) Date of Patent: Oct. 4, 2022

(54) SYSTEMS AND METHODS FOR DETECTING DAMAGE IN ROTARY MACHINES

(71) Applicant: General Electric Company, Schenectady, NY (US)

(72) Inventors: Inderdeep Kaur, Bangalore (IN); Frederick Wilson Wheeler, Niskayuna, NY (US); Michael James Rizzo, Glenville, NY (US); John Joseph Mihok, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 115 days.

(21) Appl. No.: 16/940,753

(22) Filed: Jul. 28, 2020

(65) Prior Publication Data

US 2021/0033074 A1 Feb. 4, 2021

(30) Foreign Application Priority Data

Jul. 31, 2019 (IN) .............................. 201911030887

(51) Int. Cl.
*F03D 80/70* (2016.01)
*F03D 17/00* (2016.01)
(Continued)

(52) U.S. Cl.
CPC ............. *F03D 17/00* (2016.05); *F03D 80/50* (2016.05); *F03D 80/70* (2016.05); *G01M 13/04* (2013.01)

(58) Field of Classification Search
CPC ................................ F03D 80/70; F03D 17/00
See application file for complete search history.

(56) References Cited

U.S. PATENT DOCUMENTS 7,116,095 B2 * 10/2006 Takizawa ................ B60T 8/171
324/174
7,184,930 B2 2/2007 Miyasaka et al.
(Continued)

FOREIGN PATENT DOCUMENTS

CN 103176128 A 6/2013
CN 103940608 B 10/2016
(Continued)

OTHER PUBLICATIONS

EPO Search Report, dated Jan. 12, 2021.

*Primary Examiner* — Justin D Seabe
(74) *Attorney, Agent, or Firm* — Dority & Manning, P.A.

(57) ABSTRACT

A method for detecting damage in a bearing coupled to a rotating shaft of a rotary machine includes receiving one or more measurement signals from one or more first sensors for monitoring movement of the rotating shaft in one or more directions over a time period. The method also includes removing an effect of one or more environmental and/or operating conditions of the rotary machine from the one or more measurement signals over the time period. After removing, the method includes analyzing changes in the one or more measurement signals from the one or more first sensors, wherein changes in the one or more measurement signals above a predetermined threshold or of a certain magnitude are indicative of a damaged bearing. Moreover, the method includes implementing a corrective action when the changes in the one or more measurement signals are above the predetermined threshold.

19 Claims, 7 Drawing Sheets

(51) Int. Cl.
*F03D 80/50* (2016.01)
*G01M 13/04* (2019.01)

(56) References Cited

U.S. PATENT DOCUMENTS

| | | | |
|---|---|---|---|
| 7,860,663 B2 | 12/2010 | Miyasaka et al. | |
| 8,099,255 B2 * | 1/2012 | Madge | F03D 17/00 |
| | | | 702/150 |
| 8,810,396 B2 | 8/2014 | Hedin | |
| 8,881,583 B2 | 11/2014 | Sakaguchi | |
| 9,360,393 B2 | 6/2016 | Poon et al. | |
| 9,423,290 B2 | 8/2016 | Sakaguchi et al. | |
| 9,574,570 B2 * | 2/2017 | Lillis | F04D 27/001 |
| 9,885,634 B2 | 2/2018 | Hedin | |
| 10,047,726 B2 * | 8/2018 | Sakaguchi | F03D 80/70 |
| 10,337,958 B2 | 7/2019 | Sakaguchi et al. | |
| 10,852,214 B2 * | 12/2020 | Qiao | F03D 17/00 |
| 2002/0097040 A1 | 7/2002 | Takizawa et al. | |
| 2013/0024164 A1 | 1/2013 | Paajarvi et al. | |
| 2016/0069775 A1 | 3/2016 | Thomson | |
| 2016/0076970 A1 | 3/2016 | Takahashi | |
| 2017/0260968 A1 * | 9/2017 | Tsutsui | G01M 13/04 |
| 2018/0335366 A1 | 11/2018 | Qiao et al. | |
| 2019/0048849 A1 | 2/2019 | Grunnet et al. | |
| 2019/0143582 A1 | 5/2019 | Kreutzfeldt et al. | |

FOREIGN PATENT DOCUMENTS

| | | |
|---|---|---|
| CN | 103411774 B | 12/2016 |
| CN | 108896312 A | 11/2018 |
| CN | 109187021 A | 1/2019 |
| CN | 109239598 A | 1/2019 |
| CN | 208021323 U | 3/2019 |
| EP | 2048562 B1 | 4/2009 |
| EP | 2626683 B1 | 7/2014 |
| EP | 3 431 952 A1 | 1/2019 |
| JP | 5534875 B2 | 7/2014 |
| JP | 2019074060 A | 5/2019 |
| WO | WO 2018/222341 A1 | 12/2018 |

* cited by examiner

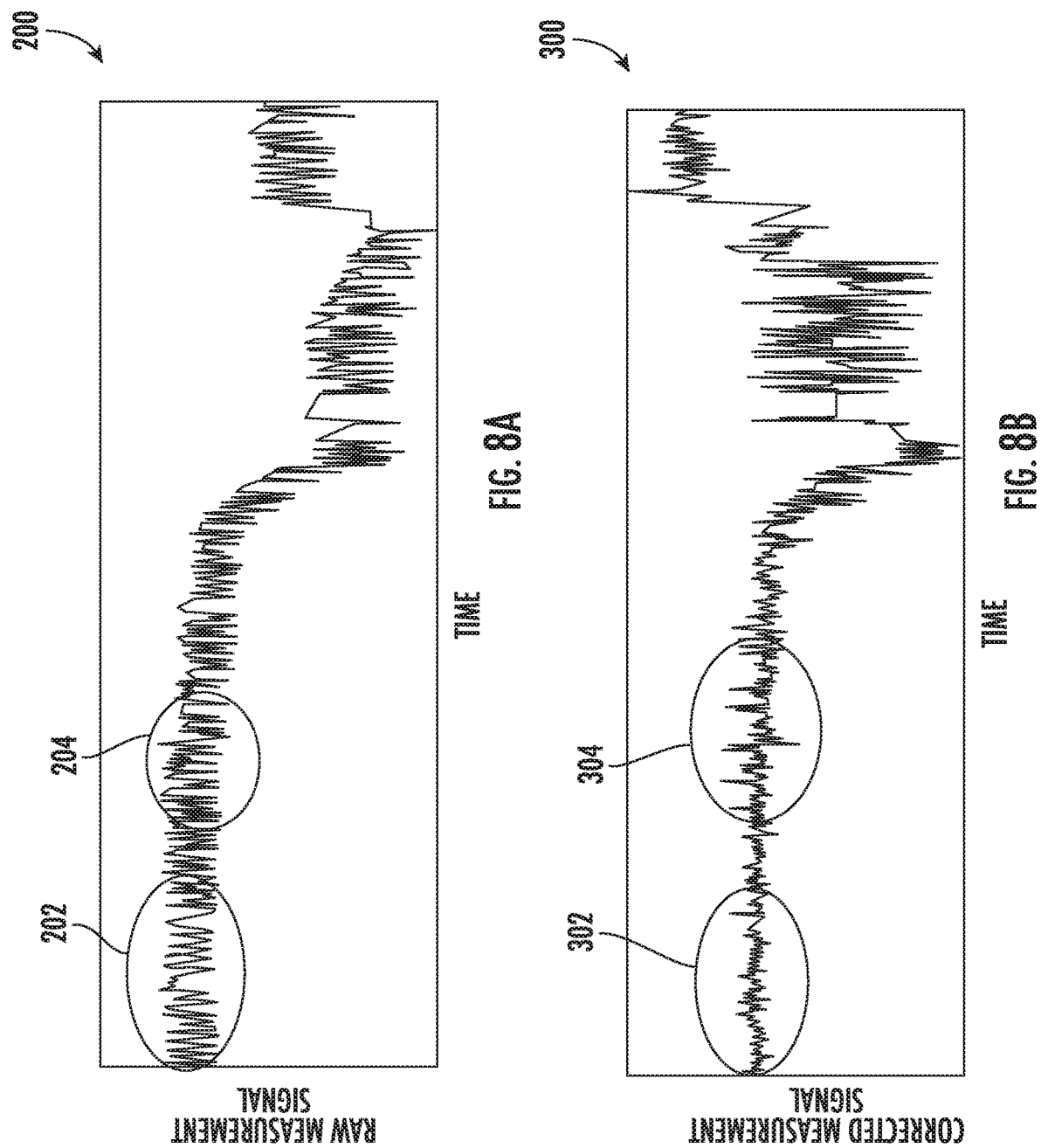

SYSTEMS AND METHODS FOR DETECTING DAMAGE IN ROTARY MACHINES

FIELD

The present disclosure relates in general to rotary machines, and more particularly to systems and methods for detecting damage in such rotary machines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a low-speed main shaft coupling the rotor blades to a gearbox, or if a gearbox is not used, directly to the generator. For example, the generator may be coupled to the low-speed main shaft such that rotation of the shaft drives the generator. For instance, the generator may include a high-speed generator shaft rotatably coupled to the main shaft through the gearbox. The generator then converts the mechanical energy from the rotor to electrical energy that may be deployed to a utility grid.

In addition, modern wind turbines include a plurality of high-speed and low-speed bearings to provide rotation of the various components thereof. For example, the low-speed main shaft typically includes one or more main bearings mounted at a forward and rearward end thereof to allow the low-speed main shaft to rotate about an axis.

Detection of damaged components in a wind turbine (or any rotary machine) is essential in minimizing unplanned downtime of the turbine and increasing turbine availability. In addition, main bearings are large components which are in the nacelle and are a very expensive component to replace. As such, the quicker a preventative or corrective action can be taken on a damaged main bearing that is allowing a main shaft to move laterally towards the gearbox, the longer the main bearing life can be prolonged. In extreme cases, this main shaft movement can damage many other components on the wind turbine adding to the cost. Some environmental and/or operating conditions can also cause the main shaft to move laterally. This motion is confounded with lateral motion due to degradation or wear of the main bearing.

For at least the aforementioned reasons, improved systems and methods for detecting damage earlier in such rotary machines, such as wind turbines, would be desired in the art.

BRIEF DESCRIPTION

Aspects and advantages of the invention will be set forth in part in the following description, or may be obvious from the description, or may be learned through practice of the invention.

In one aspect, the present disclosure is directed to a method for detecting damage in a bearing coupled to a rotating shaft of a rotary machine. The method includes receiving one or more measurement signals from one or more first sensors for monitoring movement of the rotating shaft in one or more directions over a time period. The method also includes removing an effect of one or more environmental and/or operating conditions of the rotary machine from the one or more measurement signals over the time period. After removing, the method includes analyzing changes in the one or more measurement signals from the one or more first sensors, wherein changes in the one or more measurement signals above a predetermined threshold or of a certain magnitude are indicative of a damaged bearing. Moreover, the method includes implementing a corrective action when the changes in the one or more measurement signals are above the predetermined threshold.

In an embodiment, the changes in the one or more measurement signals may be decreases in the one or more measurement signals.

In another embodiment, the method includes automatically and adaptively learning the effect of the one or more environmental and/or operating conditions. Thus, in certain embodiments, removing the effect of one or more environmental and/or operating conditions of the rotary machine from the one or more measurement signals over the time period may include automatically and adaptively eliminating the effect of one or more environmental and/or operating conditions on the movement of the rotating shaft from the one or more measurement signals. In certain embodiments, the environmental and/or operating conditions may include, for example, wind speed, wind direction, wind gust, wind shear, temperature, time of day, air density, generator speed, rotor speed, power output, thrust, and/or torque.

In further embodiments, the method may include automatically and adaptively learning and eliminating the effect of the environmental and/or operating conditions of movement of the rotating shaft via a machine learning regression model.

In additional embodiments, the machine learning regression model may utilize at least one of linear regression, non-linear regression, support vector regression, gradient boosting regression, decision tree regression, random forest regression, generalized linear models, kernel regression, or a neural network.

In another embodiment, removing the effect of one or more environmental and/or operating conditions of the rotary machine from the one or more measurement signals over the time period may include determining a predicted measurement signal of the one or more first sensors via the regression model and subtracting the predicted measurement signal from an original measurement signal of the one or more measurement signals to obtain a corrected measurement signal. In such embodiments, the corrected measurement signal isolates the lateral motion effect due to main bearing degradation or wear. If the corrected measurement signal exceeds a threshold or trends upward or downward, main bearing wear can be indicated.

Thus, in certain embodiments, analyzing the changes in the one or more measurement signals may include comparing the corrected measurement signal to the predetermined threshold or determining whether variations in the corrected measurement signal are of the certain magnitude.

In particular embodiments, the rotary machine may be wind turbine. As such, the rotating shaft may be a main shaft of the wind turbine and the bearing may be a main bearing of the wind turbine.

In several embodiments, the one or more first sensors may be one or more proximity sensors.

In yet another embodiment, implementing the corrective action may include generating an alarm, scheduling a maintenance and/or repair procedure, and/or a corrective action short of shutting down the wind turbine.

In another aspect, the present disclosure is directed to a system for detecting damage in a main bearing coupled to a main shaft of a wind turbine. The system includes one or more first sensors for monitoring movement of the main shaft in one or more directions and one or more second sensors for monitoring one or more environmental and/or operating conditions of the wind turbine. Further, the system includes a controller communicatively coupled to the one or more first and second sensors. The controller is configured to perform a plurality of operations, including but not limited to receiving one or more measurement signals from the one or more first sensors over a time period, removing an effect of one or more environmental and/or operating conditions of the rotary machine from the one or more measurement signals over the time period, analyzing decreases in the one or more measurement signals from the one or more first sensors, wherein decreases in the one or more measurement signals above a predetermined threshold or of a certain magnitude are indicative of a damaged main bearing, and implementing a corrective action when the decreases in the one or more measurement signals are above the predetermined threshold. It should also be understood that the system may further include any of the additional features described herein.

In yet another aspect, the present disclosure is directed to a method for detecting damage in a bearing coupled to a rotating shaft of a rotary machine. The method includes receiving one or more measurement signals from one or more first sensors for monitoring movement of the rotating shaft. The method also includes during a training period, automatically and adaptively learning an effect of one or more environmental and/or operating conditions on the movement of the rotating shaft via a machine learning regression model. Further, during a correction period, the method includes automatically and adaptively eliminating the effect of the one or more environmental and/or operating conditions on the movement of the rotating shaft. Moreover, the method includes analyzing decreases in the one or more measurement signals after eliminating the effect of the one or more environmental and/or operating conditions. In addition, the method includes implementing a corrective action when the decreases in the one or more measurement signals from the one or more sensors are above a predetermined threshold or are of a certain magnitude. It should also be understood that the method may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8A illustrates a graph of one embodiment of raw proximity sensor measurement data (y-axis) versus time (x-axis) according to the present disclosure; and FIG. 8B illustrates a graph of one embodiment of corrected proximity sensor measurement data (y-axis) versus time (x-axis) according to the present disclosure.

DETAILED DESCRIPTION

Figure 1:
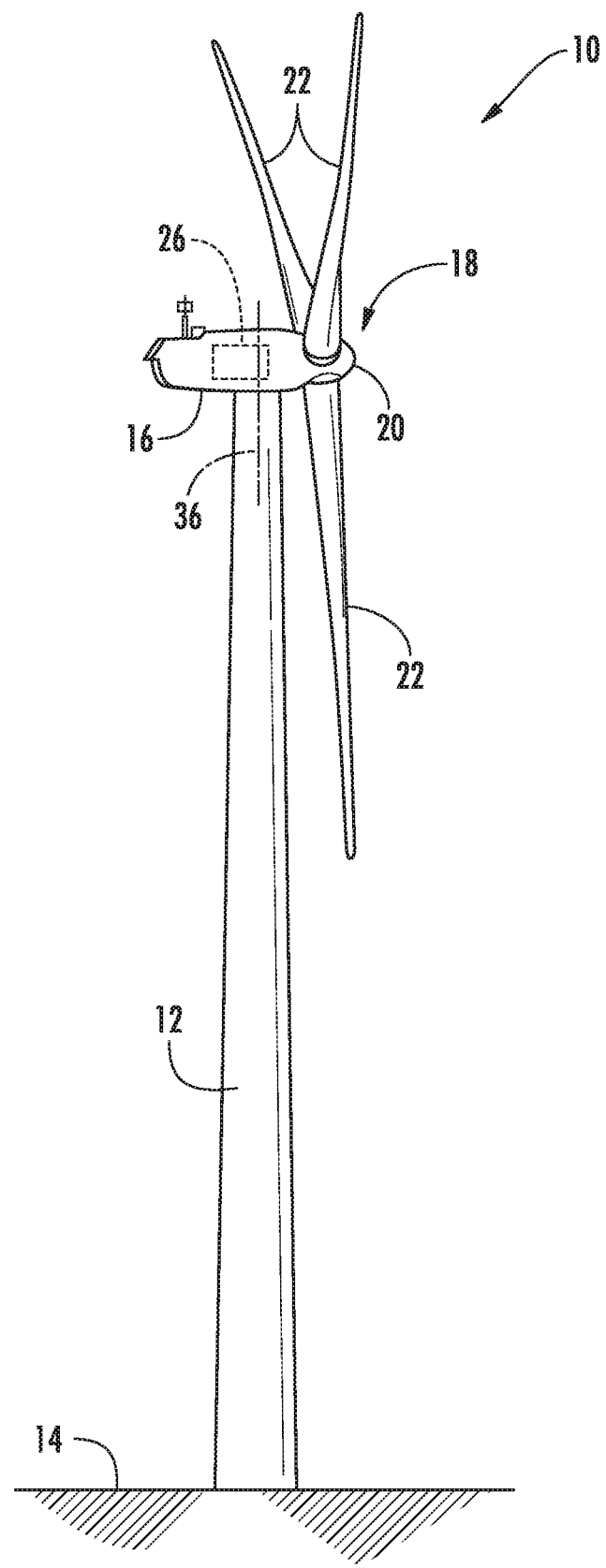
FIG. 1 illustrates a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for detecting damaged components in rotary machines, such as wind turbines. More specifically, the present disclosure provides early detection of a wind turbine main bearing failure using a main shaft proximity sensor. A slow drift in the measurement signals from a main shaft proximity sensor can indicate a problem in the main bearing. A slightly worn main bearing allows the main shaft to move laterally, decreasing the proximity sensor measurement signals. However, variations in a proximity sensor measurement signals can also be affected by multiple additional factors, such as wind speed and temperature. As such, the systems and methods of the present disclosure extract and monitor only the component of the proximity the proximity sensor measurement signals that is due to an approaching main bearing failure. More specifically, the systems and methods of the present disclosure automatically and adaptively learn and eliminate the effect of known and systematic causes from the original measurement signals. The method can then detect the drift much earlier than existing methods and provide an earlier warning of a main bearing fault.

Referring now to the drawings, FIG. 1 illustrates a perspective view of one embodiment of a wind turbine 10 according to the present disclosure. Though the present disclosure is described with reference to wind turbines, it should be understood that the systems and methods of the present disclosure may be applicable to any rotary machines (e.g., gas turbines, steam turbines, or any other turbine system for power generation). As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to drivetrain system 28 (FIG. 2) positioned within the nacelle 16 to permit electrical energy to be produced.

Figure 2:
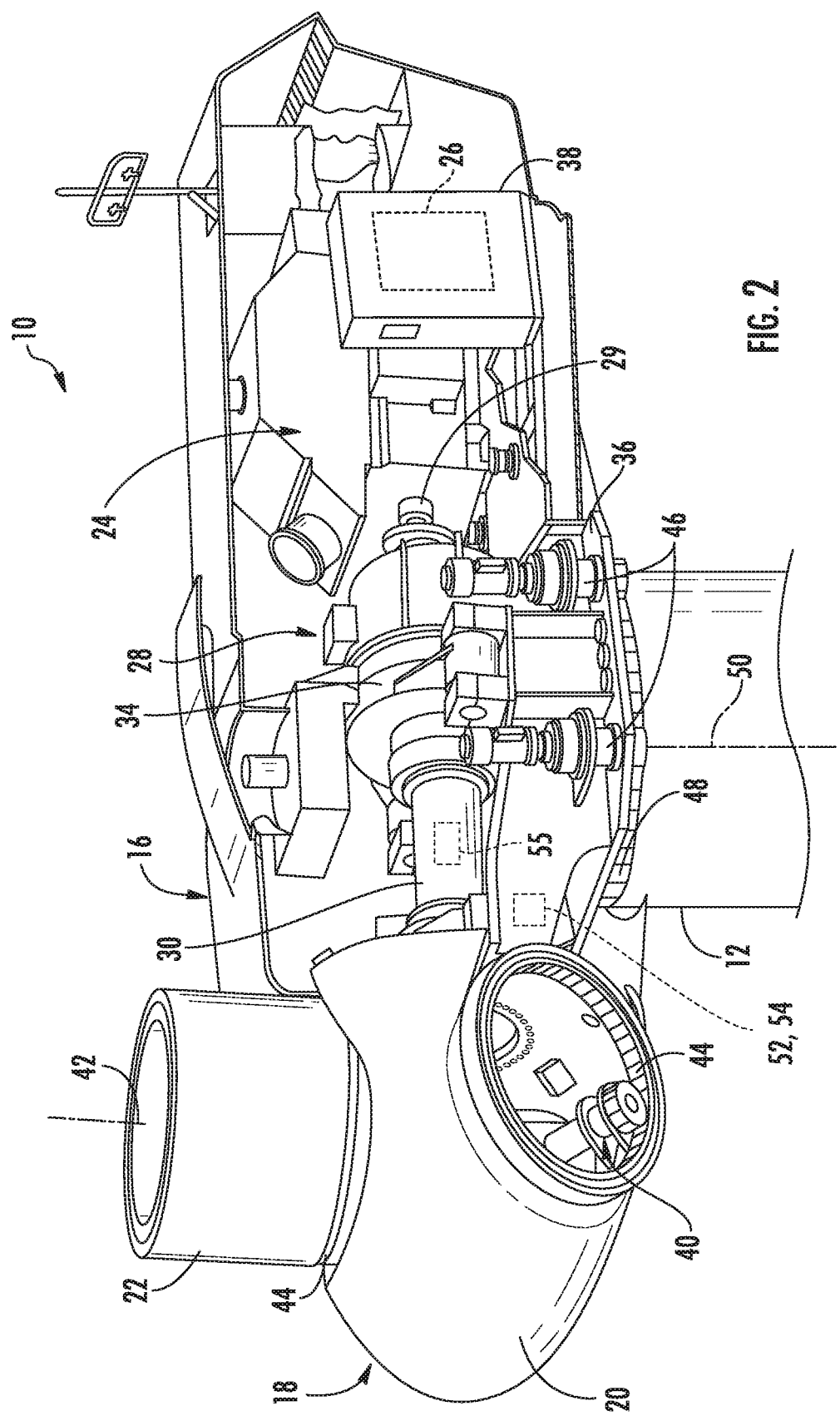
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 housing the drivetrain system 28 therein is illustrated. As shown, the drivetrain system 28 includes, at least, a generator 24 disposed within the nacelle 16. In general, the generator 24 may be coupled to the rotor 18 of the wind turbine 10 for generating electrical power from the rotational energy generated by the rotor 18. For example, the rotor 18 may include a main shaft 30 coupled to the hub 20 for rotation therewith. The generator 24 may then be coupled to the main shaft 30 such that rotation of the main shaft 30 drives the generator 24. For instance, in the illustrated embodiment, the generator 24 includes a generator shaft 29 rotatably coupled to the main shaft 30 through a gearbox 34. However, in other embodiments, it should be appreciated that the generator shaft 29 may be rotatably coupled directly to the main shaft 30. Alternatively, the generator 24 may be directly rotatably coupled to the main shaft 30. It should be appreciated that the main shaft 30 may generally be supported within the nacelle 16 by a support frame or bedplate 36 positioned atop the wind turbine tower 12.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 38 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 40 configured to rotate each rotor blade 22 about its pitch axis 42 via pitch bearing 44. Similarly, the wind turbine 10 may include one or more yaw drive mechanisms 46 communicatively coupled to the controller 26, with each yaw drive mechanism(s) 46 being configured to change the angle of the nacelle 16 relative to the wind (e.g., by engaging a yaw bearing 48 of the wind turbine 10 to rotate the nacelle 16 about yaw axis 50).

In addition, as shown in FIG. 2, the wind turbine 10 may further include one or more sensors 52, 53, 54, 55. For example, as shown, one or more first sensors 52, 54 may be used for monitoring movement of the main shaft 30 in one or more directions. Such first sensors may be, for example, proximity sensors positioned near the main shaft 30 for monitoring movement of the shaft 30 in one or more directions so as to detect damage of the main bearing 39 described herein. In addition, as shown, one or more second sensors 53, 55 may be configured for monitoring or measuring any suitable environmental and/or operating conditions that may affect lateral motion of the shaft 30, such as for example, a wind sensor 53 and/or an additional sensor 55 positioned within the nacelle 16 for monitoring various operating conditions of the drivetrain system 28. Thus, it should be understood that the first and second sensors described herein 52, 53, 54, 55 may be any suitable sensor capable of monitoring movement of the main shaft 30 as well as any other shaft in the wind turbine 10. In addition, it should be understood that the wind turbine 10 may include any suitable number of sensors for monitoring such movement.

Figure 3:
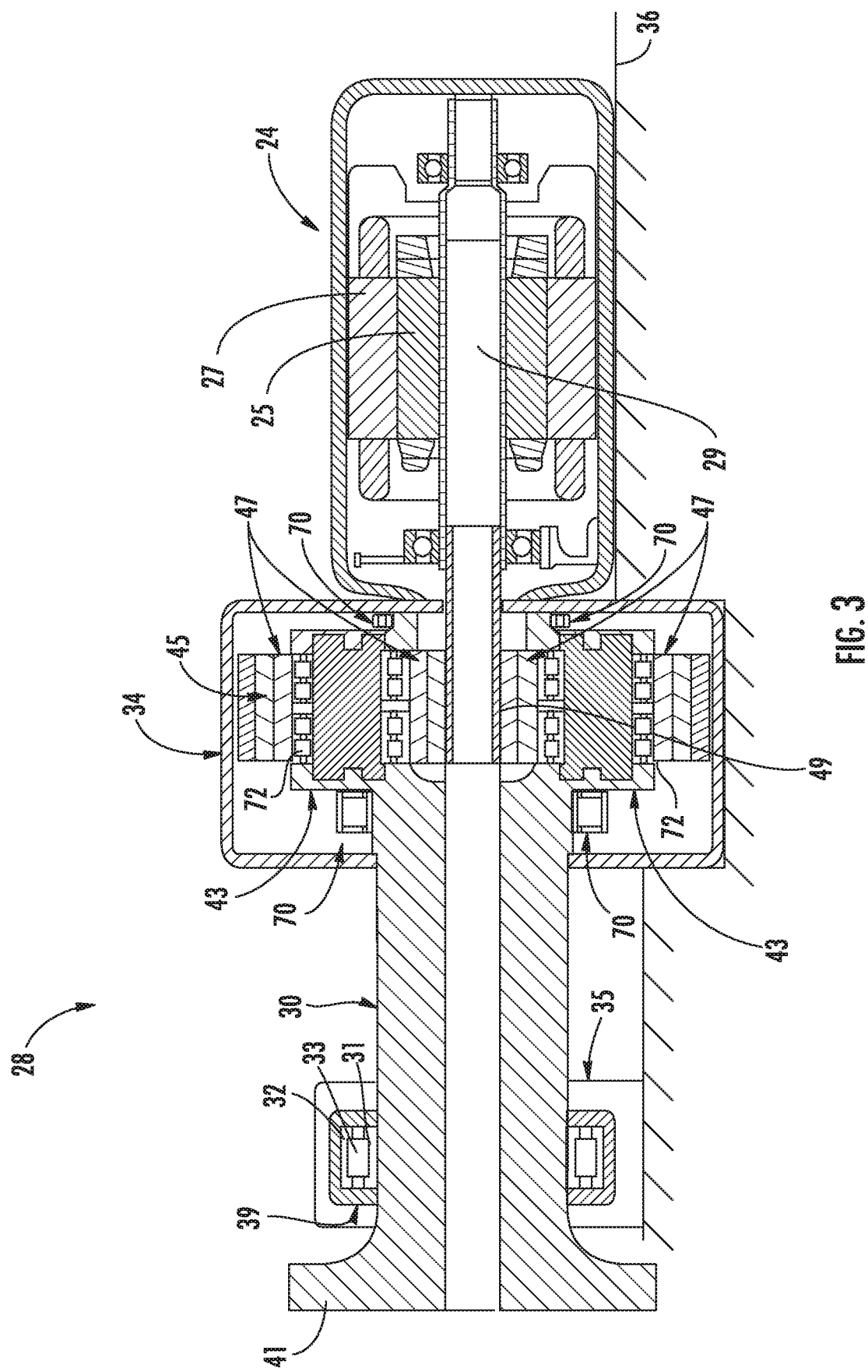
FIG. 3 illustrates a cross-sectional view of one embodiment of a drivetrain system of a wind turbine according to the present disclosure.

Referring now to FIG. 3, a detailed, cross-sectional view of the drivetrain system 28 of the wind turbine 10 is illustrated to further depict the various components thereof. As mentioned, the drivetrain system 28 includes, at least, the generator 24 and the gearbox 34. Further, as shown, the generator 24 includes a generator rotor 25 and a generator stator 27. As is generally known in the art, the generator rotor 25 is the rotating component of the generator 24, while the stator 27 is the stationary component of the generator 24. Further, in certain embodiments, the generator 24 may be a doubly-fed induction generator (DFIG). However, it should be understood that the generator 24 according to the present disclosure is not limited to DFIG generators, and may include any generator suitable for powering the wind turbine 10 of the present disclosure. In general, the rotor blades 16 rotate the generator rotor 25 of the generator 24. As such, the generator rotor 25 may be operably connected to the hub 18. Accordingly, operation of the rotor blades 16 rotates the rotor hub 18, which rotates the generator rotor 25 and thus operates the generator 24.

Further, as shown, the low-speed main shaft 30 is configured to provide an input rotational speed to the gearbox 34. For example, the hub 18 may be mounted to the main shaft 30. As shown, the main shaft 30 may include a main flange 41 configured to engage a mating flange (not shown) on the hub 18 to mount the hub 18 to the main shaft 30. Thus, during operation of the wind turbine 10, the rotational speed of the rotor blades 16 may be directly transmitted through the hub 18 to the main shaft 30 as an input rotational speed.

The main shaft 30 may extend through and be supported by at least one support housing 35 or a plurality of support housings 35. For example, a first housing 35 and, in some embodiments, a second housing (not shown), may be provided to support the main shaft 30. In addition, the housing(s) 35 may include one or more main bearings 39 configured to interact with the main shaft 30. For example, as shown, the housing(s) 35 may include a locating bearing 39 (also referred to herein as a main shaft bearing 39) configured therein, while the second housing may include a floating bearing (not shown) configured therein. It should be understood that the present disclosure is not limited to locating bearings and floating bearings positioned in housings as described above and the figures are provided for illustrative purposes only. Further, as shown, the main shaft bearing(s) 39 may include an inner race 31, an outer race 32, and a plurality roller elements 33 configured therebetween.

Still referring to FIG. 3, the gearbox 34 as described herein may be a planetary gearbox 34. As such, the gearbox 34 may be configured to convert the input rotational speed from the main shaft 30 to an output rotational speed. In one embodiment, the output rotational speed may be faster than the input rotational speed. Alternatively, however, the output rotational speed may be slower than the input rotational speed. In one embodiment, the gearbox 34 may be a single stage gearbox. Thus, the input rotational speed may be converted to the output rotational speed through a single stage of various mating gears, as discussed below. Alternatively, however, the gearbox 34 may be a multiple stage gearbox, and the input rotational speed may be converted to the output rotational speed through multiple stages of various mating gears.

More specifically, the illustrated embodiment of the planetary gearbox 34 includes a stationary ring gear 45 and a plurality of rotatable gears. As such, the stationary ring gear 45 supports the various rotatable gears configured therein. In addition, the stationary ring gear 45 includes various axes for the rotatable gears to rotate about. In certain embodiments, the planetary gearbox 34 may also include a stationary ring gear 45, one or more rotatable planetary gears 47, and a rotatable sun gear 49. For example, in one embodiment, the planetary gearbox 34 may include four planetary gears 47. However, it should be understood that more or less than four planetary gears 47 are within the scope and spirit of the present disclosure. In addition, each of the rotatable gears in the planetary gearbox 34 includes a plurality of gear teeth (not shown). As such, the teeth may mesh together such that the various gears 45, 47, 49 engage each other.

In several embodiments, the carrier 43 may drive the planetary gearbox 34. Thus, the carrier 43 and the main shaft 30 may be coupled such that the input rotational speed of the main shaft 30 is provided to the carrier 43. For example, a gearbox disk may connect the carrier 43 and main shaft 30, or the carrier 43 and main shaft 30 may be otherwise suitably connected. Alternatively, however, the ring gear 45 or the sun gear 49 may drive the planetary gearbox 34.

Referring still to FIG. 3 and as mentioned, the drivetrain system 28 of the present disclosure may further include an output or generator shaft 29. More specifically, as shown, the generator shaft 29 may be coupled with the gearbox 34, and configured to rotate at the output rotational speed. In particular embodiments, for example, the generator shaft 29 may be the sun gear 49. Thus, the sun gear 49 may engage the planetary gears 47 and may further extend from the planetary gearbox 34 towards the generator 24. In other embodiments, the generator shaft 29 may be coupled to the sun gear 49 or other output gear of the planetary gearbox 34 or other suitable gearbox such that the generator shaft 29 may rotate at the output rotational speed.

In addition, various bearings 39, 70, 72 may surround the various rotatable components of the drivetrain system 28 to facilitate relatively efficient rotation of such rotatable components. For example, as shown, a plurality of carrier bearings 70 may surround the planetary carrier 43 and a plurality of planet bearings 72 may surround the planetary gears 47 and/or additional bearings which support the sun gear or sun gear shaft (not shown). Such bearings 70, 72 may be roller bearings, and include various roller elements arranged in generally annular arrays, or may be journal bearings or any other suitable bearings. In addition, the bearings 39, 70, 72 as described herein may also be referred to as low-speed bearings.

Figure 4:
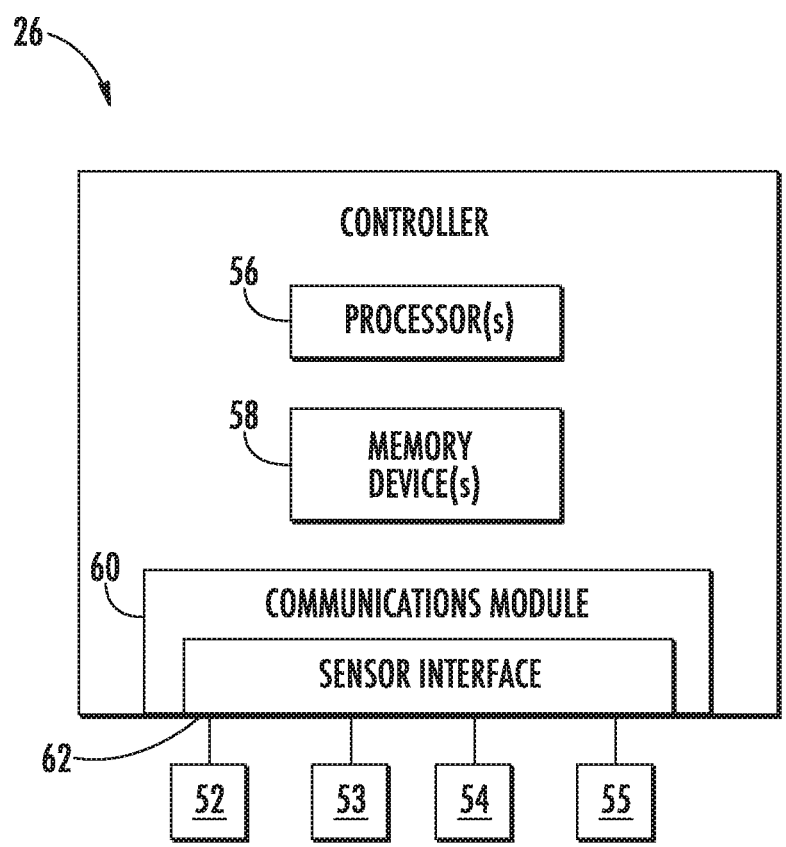
FIG. 4 illustrates a block diagram of one embodiment of suitable components that may be included in a wind turbine controller according to the present disclosure.

Referring now to FIG. 4, there is illustrated a block diagram of one embodiment of suitable components that may be included within the turbine controller 26 (or a separate controller) according to the present disclosure. As shown, the controller 26 may include one or more processor(s) 56 and associated memory device(s) 58 configured to perform a variety of computer-implemented functions (e.g., performing the methods, steps, calculations and the like and storing relevant data as disclosed herein). Additionally, the controller 26 may also include a communications module 60 to facilitate communications between the controller 26 and the various components of the wind turbine 10. Further, the communications module 60 may include a sensor interface 62 (e.g., one or more analog-to-digital converters) to permit signals transmitted from the sensors 52, 53, 54, 55 to be converted into signals that can be understood and processed by the processors 56. It should be appreciated that the sensors 52, 53, 54, 55 may be communicatively coupled to the communications module 64 using any suitable means. For example, as shown in FIG. 4, the sensors 52, 53, 54, 55 are coupled to the sensor interface 62 via a wired connection. However, in other embodiments, the sensors 52, 53, 54, 55 may be coupled to the sensor interface 62 via a wireless connection, such as by using any suitable wireless communications protocol known in the art.

In additional embodiments, the sensors 52, 53, 54, 55 may also be coupled to a separate controller that may or may not be located in the control cabinet 38. As such, the sensors 52, 53, 54, 55 may provide related information to the turbine controller 26 and/or the separate controller. It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors 52, 53, 54, 55 described herein may, for example, be used to generate signals relating to the parameter being monitored, which can then be utilized by the controller 26 to determine the condition.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 58 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 58 may generally be configured to store suitable computer-readable instructions that, when implemented by the processor(s) 56, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 5:
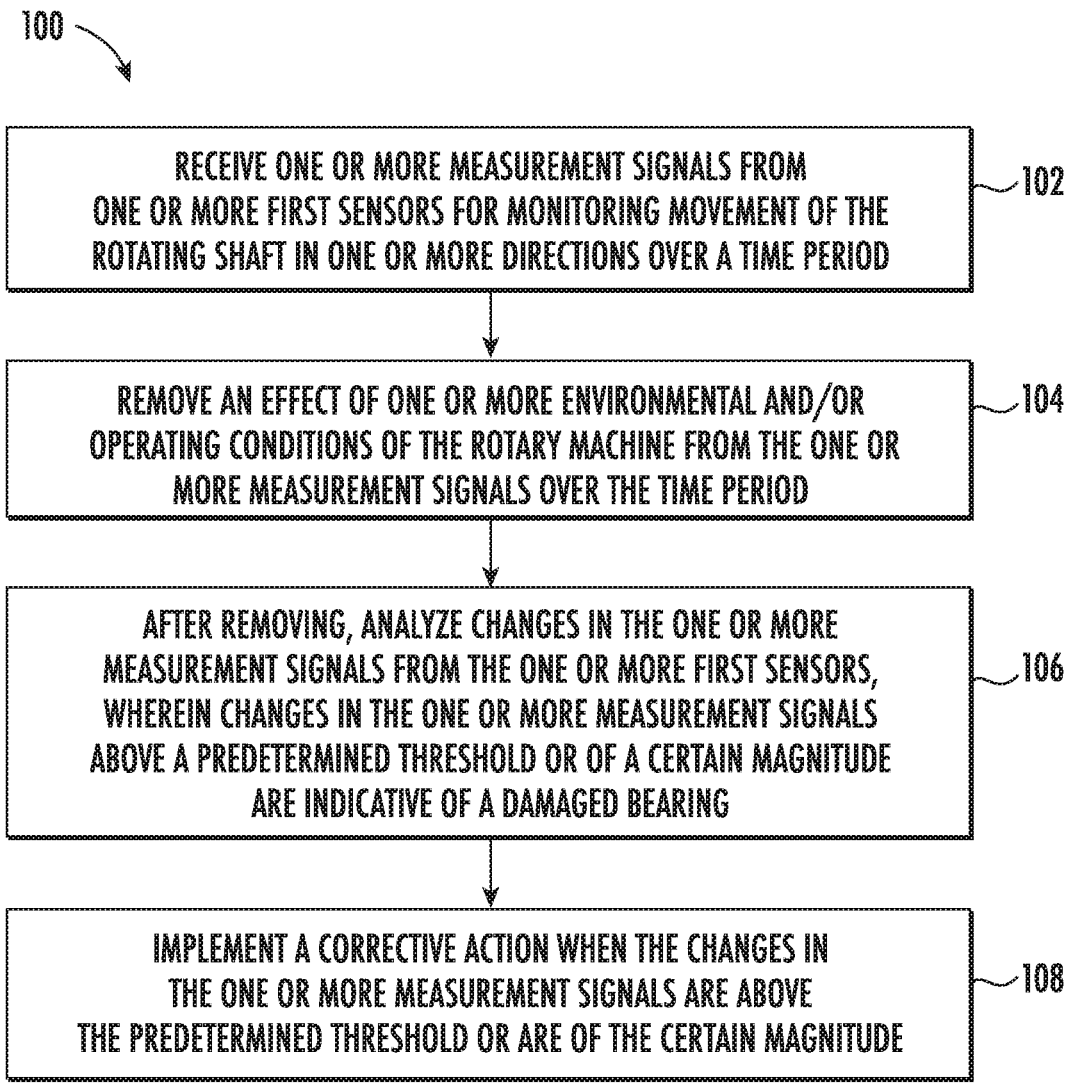
FIG. 5 illustrates a flow diagram of one embodiment of a method for detecting damage in a bearing of a rotary machine according to the present disclosure.

Referring now to FIG. 5, the turbine controller 26 (or any separate controller or computing system integral with or remote from the turbine controller 26) is further configured to implement an algorithm for detecting damage in a bearing coupled to a rotating shaft of a rotary machine, such as the wind turbine 10. In general, the method 100 described herein generally applies to the wind turbine 10 described above. However, it should be appreciated that the disclosed method 100 may be implemented using any other suitable rotary machine having a rotating shaft and associated bearing. Further, FIG. 5 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (102), the method 100 includes receiving one or more measurement signals from the first sensor(s) 52, 54 for monitoring movement of the main shaft 30 in one or more directions over a time period. In one embodiment, for example, the direction may include lateral direction with respect to a longitudinal direction of the main shaft 30. It should be understood that the method 100 may also include monitoring various environmental and/or operating conditions of the wind turbine 10 via the second sensor(s) 53, 55.

Figure 6:
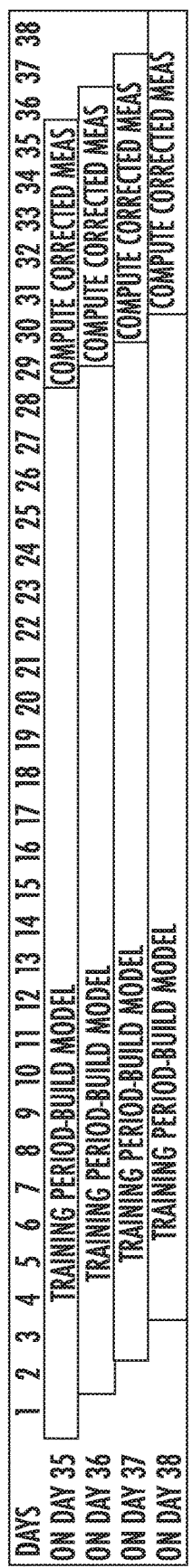
FIG. 6 illustrates a timeline chart of one embodiment of the rolling training period and the correction period of the controller according to the present disclosure.

As shown at (104), the method 100 includes removing an effect of one or more environmental and/or operating conditions of the wind turbine 10 from the one or more measurement signals over the time period. For example, in an embodiment, during a training period as shown in FIG. 6, a controller may automatically and adaptively learn the effect of one or more environmental and/or operating conditions on the movement of the main shaft 30, e.g. by monitoring the environmental and/or operating conditions via second sensors 53, 55. Further, in an embodiment, the training period can include any suitable time period, for example, range from 1 day to 50 days, such as 28, 29, 30, or 31 days as shown. In addition, in certain embodiments, the environmental and/or operating conditions may include, for example, wind speed, wind direction, wind gust, wind shear, temperature, time of day, air density, generator speed, rotor speed, power output, thrust, and/or torque.

Thus, in a subsequent correction period, the controller is configured to remove the effect of the environmental and/or operating condition(s) of the wind turbine 10 from the one or more measurement signals by automatically and adaptively eliminating the effect of one or more environmental and/or operating conditions on the movement of the rotating shaft 30 from the measurement signal(s) (i.e. data from sensors 53, 55). For example, as shown in FIG. 6, during the correction period, the controller can automatically and adaptively eliminate the effect of one or more environmental and/or operating conditions on the movement of the rotating shaft 30 from the measurement signal(s), i.e. by computing a corrected measurement signal.

Figure 7:
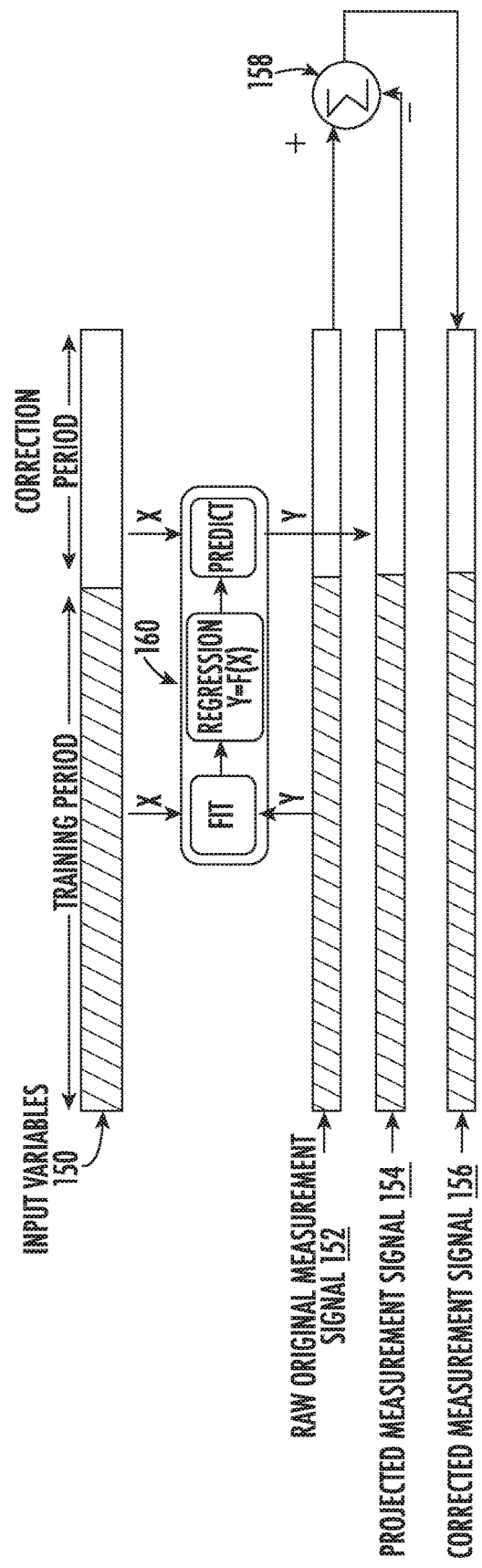
FIG. 7 illustrates a detailed, schematic diagram of one embodiment of the training period and the correction period of the controller according to the present disclosure.

Referring particularly to FIG. 7, a schematic diagram of one embodiment of the training period and the correction period of the controller according to the present disclosure is illustrated. During the training period, the controller can assume no movement of the shaft 30; however, movement is detected or expected during the correction period. More specifically, as shown, the method 100 may include automatically and adaptively learning and eliminating the effect of the environmental and/or operating conditions (e.g. input variables 150) on the movement of the main shaft 30 via a machine learning regression model 160. In particular embodiments, the machine learning regression model 160 may utilize at least one of linear regression, non-linear regression, support vector regression, gradient boosting regression, decision tree regression, random forest regression, generalized linear models, kernel regression, or a neural network. For example, in one embodiment, the machine learning regression model may be represented by Equation (1) below:

$$Y = f(X) + g(Z) + e \quad \text{Equation (1)}$$

Where Y is the sensor measurement signal;
f is the variation in the sensor measurement signal due to the environmental and/or operating conditions;
g is the variation in the sensor measurement signal due to bearing wear or damage;
X represent the factors contributing to the environmental and/or operating conditions;
Z is the bearing wear or damage; and
e is random noise in the sensor measurement signal.

Accordingly, to understand the bearing wear or damage (i.e. Z), the controller may be configured to estimate g(Z) using Equation (1), where $\hat{f}$ and $\hat{g}$ are estimators of f and g, respectively:

$$\hat{g}(Z) = Y - \hat{f}(X) \quad \text{Equation (2)}$$

Using Equation (2), the controller can derive Equation (3):

$$\hat{g}(Z) = g(Z) + e_f + e \quad \text{Equation (3)}$$

Where $e_f = f(X) - \hat{f}(x)$ and is the error estimation of f. Moreover, as Equation (3) suggests, $\hat{g}(Z)$ is the variation in the measurement signal due to the main bearing wear, along with random noise and the error in the estimation of systematic variation. Thus, instead of working with Y (as set forth in Equation (2)), the controller uses $\hat{g}(Z)$.

Still referring to FIG. 7, as shown, the controller is configured to removing the effect of the environmental and/or operating condition(s) of the wind turbine 10 from the one or more measurement signals over the time period by determining a predicted measurement signal 154 of the sensor(s) via the regression model 160. Further, as shown at 158, the controller is configured to subtract the predicted measurement signal 154 from an original measurement signal 152 of the measurement signal(s) to obtain a corrected measurement signal 156 using e.g. via Equation (2).

Referring back to FIG. 5, as shown at (106), the method 100 includes analyzing changes in the measurement signal(s), wherein changes in the measurement signal(s) above a predetermined threshold or of a certain magnitude are indicative of a damaged bearing (e.g. a damaged main bearing 39). In an embodiment, for example, the changes or variations in the measurement signal(s) may be decreases in the measurement signal(s). Thus, in certain embodiments, the controller is configured to analyze the changes/variations in the measurement signal(s) by comparing the corrected measurement signal to the predetermined threshold or by determining whether variations in the corrected measurement signal are of the certain magnitude. In the latter example, a high-degree of variation in the corrected measurement signal can be indicative that the measurement signal is no longer accurately predicted by the operation and environmental signals.

Thus, as shown at (108), the method 100 includes implementing a corrective action when the changes/variations in the measurement signal(s) are above the predetermined threshold or are of the certain magnitude. For example, in one embodiment, the corrective action may include any suitable action short of shutting down the wind turbine 10, such as for example generating an alarm, scheduling a maintenance and/or repair procedure.

Advantages of the present disclosure can be better understood with respect to FIGS. 8A and 8B. For example, as shown, FIG. 8A illustrates a graph 200 of raw proximity sensor measurement data (y-axis) versus time (x-axis), whereas FIG. 8B illustrates a graph 300 of corrected proximity sensor measurement data (y-axis) versus time (x-axis). As shown particularly via the circled areas 202 and 302, there is a significant reduction in the root square mean deviation of the after elimination of the system variations. Thus, as shown via circled areas 204 and 304, the data provides clearer and earlier detection of bearing faults.

Various aspects and embodiments of the present invention are defined by the following numbered clauses:

Clause 1. A method for detecting damage in a bearing coupled to a rotating shaft of a rotary machine, the method comprising:

receiving one or more measurement signals from one or more first sensors for monitoring movement of the rotating shaft in one or more directions over a time period;

removing an effect of one or more environmental and/or operating conditions of the rotary machine from the one or more measurement signals over the time period;

after removing, analyzing changes in the one or more measurement signals from the one or more first sensors, wherein changes in the one or more measurement signals above a predetermined threshold or of a certain magnitude are indicative of a damaged bearing; and implementing a corrective action when the changes in the one or more measurement signals are above the predetermined threshold.

Clause 2. The method of Clause 1, wherein the changes in the one or more measurement signals comprise decreases in the one or more measurement signals.

Clause 3. The method of any of the preceding clauses, further comprising monitoring, via one or more second sensors, the one or more environmental and/or operating conditions of the rotary machine; and automatically and adaptively learning the effect of the one or more environmental and/or operating conditions on the movement of the rotating shaft from the one or more measurement signals.

Clause 4. The method of Clause 3, wherein removing the effect of the one or more environmental and/or operating conditions of the rotary machine from the one or more measurement signals over the time period further comprises: automatically and adaptively eliminating the effect of the one or more environmental and/or operating conditions on the movement of the rotating shaft from the one or more measurement signals.

Clause 5. The method of Clause 4, further comprising automatically and adaptively learning and eliminating the effect of the environmental and/or operating conditions of movement of the rotating shaft via a machine learning regression model.

Clause 6. The method of Clause 5, wherein the machine learning regression model utilizes at least one of linear regression, non-linear regression, support vector regression, gradient boosting regression, decision tree regression, random forest regression, generalized linear models, kernel regression, or a neural network.

Clause 7. The method of Clause 5, wherein removing the effect of the one or more environmental and/or operating conditions of the rotary machine from the one or more measurement signals over the time period further comprises:

determining a predicted measurement signal of the one or more first sensors via the regression model; and, subtracting the predicted measurement signal from an original measurement signal of the one or more measurement signals to obtain a corrected measurement signal.

Clause 8. The method of Clause 7, wherein analyzing the changes in the one or more measurement signals further comprises comparing the corrected measurement signal to the predetermined threshold or determining whether variations in the corrected measurement signal are of the certain magnitude.

Clause 9. The method of Clause 3, wherein the rotary machine comprises a wind turbine, the rotating shaft comprises a main shaft of the wind turbine, and the bearing comprises a main bearing of the wind turbine.

Clause 10. The method of Clause 9, wherein the environmental and/or operating conditions comprise at least one of wind speed, wind direction, wind gust, wind shear, temperature, time of day, air density, generator speed, rotor speed, power output, thrust, or torque.

Clause 11. The method of any of the preceding clauses, wherein the one or more first sensors comprise one or more proximity sensors.

Clause 12. The method of any of the preceding clauses, wherein the one or more directions comprise, at least, a lateral direction with respect to a longitudinal direction of the rotating shaft.

Clause 13. The method of any of the preceding clauses, wherein implementing the corrective action further comprise at least one of generating an alarm or scheduling a maintenance and/or repair procedure.

Clause 14. A system for detecting damage in a main bearing coupled to a main shaft of a wind turbine, the system comprising:

one or more first sensors for monitoring movement of the main shaft in one or more directions;

one or more second sensors for monitoring one or more environmental and/or operating conditions of the wind turbine; and a controller communicatively coupled to the one or more first and second sensors, the controller configured to perform a plurality of operations, the plurality of operations comprising:

receiving one or more measurement signals from the one or more first sensors over a time period;

removing an effect of one or more environmental and/or operating conditions of the wind turbine from the one or more measurement signals over the time period;

analyzing decreases in the one or more measurement signals from the one or more first sensors, wherein decreases in the one or more measurement signals above a predetermined threshold or of a certain magnitude are indicative of a damaged main bearing; and, implementing a corrective action when the decreases in the one or more measurement signals are above the predetermined threshold.

Clause 15. The system of Clause 14, wherein the plurality of operations further comprise automatically and adaptively learning the effect of the one or more environmental and/or operating conditions on the movement of the main shaft from the one or more measurement signals.

Clause 16. The system of Clause 15, wherein the environmental and/or operating conditions comprise at least one of wind speed, wind direction, wind gust, wind shear, temperature, air density, generator speed, rotor speed, power output, or torque.

Clause 17. The system of Clause 15, wherein removing the effect of the one or more environmental and/or operating conditions of the rotary machine from the one or more measurement signals over the time period further comprises: automatically and adaptively learning and eliminating the effect of the environmental and/or operating conditions of movement of the rotating shaft via a machine learning regression model.

Clause 18. The system of Clause 17, wherein removing the effect of the one or more environmental and/or operating conditions of the rotary machine from the one or more measurement signals over the time period further comprises: determining a predicted measurement signal of the one or more first sensors via the regression model; and, subtracting the predicted measurement signal from an original measurement signal of the one or more measurement signals to obtain a corrected measurement signal.

Clause 19. The system of Clause 18, wherein analyzing the decreases in the one or more measurement signals from the one or more first sensors further comprises comparing the corrected measurement signal to the predetermined threshold or determining whether variations in the corrected measurement signal are of the certain magnitude.

Clause 20. A method for detecting damage in a bearing coupled to a rotating shaft of a rotary machine, the method comprising:
receiving one or more measurement signals from one or more first sensors for monitoring movement of the rotating shaft;
during a training period, automatically and adaptively learning an effect of one or more environmental and/or operating conditions on the movement of the rotating shaft via a machine learning regression model;
during a correction period, automatically and adaptively eliminating the effect of the one or more environmental and/or operating conditions on the movement of the rotating shaft; and,
analyzing decreases in the one or more measurement signals after eliminating the effect of the one or more environmental and/or operating conditions; and,
implementing a corrective action when the decreases in the one or more measurement signals from the one or more sensors are above a predetermined threshold or are of a certain magnitude.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting damage in a bearing coupled to a rotating shaft of a rotary machine, the method comprising:
receiving one or more measurement signals from one or more first sensors for monitoring movement of the rotating shaft over a time period;
removing an effect of one or more environmental or operating conditions of the rotary machine from the one or more measurement signals over the time period;
after removing, analyzing changes in the one or more measurement signals from the one or more first sensors, wherein changes in the one or more measurement signals above a predetermined threshold or of a certain magnitude are indicative of a damaged bearing;
implementing a corrective action when the changes in the one or more measurement signals are above the predetermined threshold;
monitoring, via one or more second sensors, the one or more environmental or operating conditions of the rotary machine; and
wherein removing the effect of the one or more environmental or operating conditions of the rotary machine from the one or more measurement signals over the time period further comprises:
determining a predicted measurement signal of the one or more first sensors; and
subtracting the predicted measurement signal from an original measurement signal of the one or more measurement signals to obtain a corrected measurement signal.

2. The method of claim 1, wherein the changes in the one or more measurement signals comprise decreases in the one or more measurement signals.

3. The method of claim 1, wherein removing the effect of the one or more environmental or operating conditions of the rotary machine from the one or more measurement signals over the time period further comprises:
automatically and adaptively learning and eliminating the effect of the one or more environmental or operating conditions on the movement of the rotating shaft from the one or more measurement signals.

4. The method of claim 3, wherein the automatic and adaptive learning and eliminating the effect of the environmental or operating conditions on the movement of the rotating shaft from the one or more measurement signals is done via a machine learning regression model.

5. The method of claim 4, wherein the machine learning regression model utilizes at least one of linear regression, non-linear regression, support vector regression, gradient boosting regression, decision tree regression, random forest regression, generalized linear models, kernel regression, or a neural network.

6. A method for detecting damage in a bearing coupled to a rotating shaft of a rotary machine, the method comprising:
receiving one or more measurement signals from one or more first sensors for monitoring movement of the rotating shaft in one or more directions over a time period;
removing an effect of one or more environmental or operating conditions of the rotary machine from the one or more measurement signals over the time period;
after removing, analyzing changes in the one or more measurement signals from the one or more first sensors, wherein changes in the one or more measurement signals above a predetermined threshold or of a certain magnitude are indicative of a damaged bearing;
implementing a corrective action when the changes in the one or more measurement signals are above the predetermined threshold;
monitoring, via one or more second sensors, the one or more environmental or operating conditions of the rotary machine;
wherein removing the effect of the one or more environmental or operating conditions of the rotary machine from the one or more measurement signals over the time period further comprises:
automatically and adaptively learning and eliminating the effect of the one or more environmental or operating conditions on the movement of the rotating shaft from the one or more measurement signals via a machine learning regression model;
determining a predicted measurement signal of the one or more first sensors via the regression model; and,
subtracting the predicted measurement signal from an original measurement signal of the one or more measurement signals to obtain a corrected measurement signal.

7. The method of claim 6, wherein analyzing the changes in the one or more measurement signals further comprises comparing the corrected measurement signal to the predetermined threshold or determining whether variations in the corrected measurement signal are of the certain magnitude.

8. The method of claim 1, wherein the rotary machine comprises a wind turbine, the rotating shaft comprises a main shaft of the wind turbine, and the bearing comprises a main bearing of the wind turbine.

9. The method of claim 8, wherein the environmental or operating conditions comprise at least one of wind speed, wind direction, wind gust, wind shear, temperature, time of day, air density, generator speed, rotor speed, power output, thrust, or torque.

10. The method of claim 1, wherein the one or more first sensors comprise one or more proximity sensors.

11. The method of claim 1, wherein the one or more directions comprise, at least, a lateral direction with respect to a longitudinal direction of the rotating shaft.

12. The method of claim 1, wherein implementing the corrective action further comprise at least one of generating an alarm or scheduling a maintenance or repair procedure.

13. A system for detecting damage in a main bearing coupled to a main shaft of a wind turbine, the system comprising:
one or more first sensors configured to monitor movement of the main shaft relative to a longitudinal axis of the main shaft;
one or more second sensors for monitoring one or more environmental or operating conditions of the wind turbine; and
a controller communicatively coupled to the one or more first and second sensors, the controller configured to perform a plurality of operations, the plurality of operations comprising:
receiving one or more measurement signals from the one or more first sensors over a time period;
removing an effect of one or more environmental or operating conditions of the wind turbine from the one or more measurement signals over the time period;
analyzing decreases in the one or more measurement signals from the one or more first sensors, wherein decreases in the one or more measurement signals above a predetermined threshold or of a certain magnitude are indicative of a damaged main bearing; and,
implementing a corrective action when the decreases in the one or more measurement signals are above the predetermined threshold;
wherein removing the effect of the one or more environmental or operating conditions of the rotary machine from the one or more measurement signals over the time period further comprises:
determining a predicted measurement signal of the one or more first sensors; and
subtracting the predicted measurement signal from an original measurement signal of the one or more measurement signals to obtain a corrected measurement signal.

14. The system of claim 13, wherein the plurality of operations further comprise automatically and adaptively learning the effect of the one or more environmental or operating conditions on the movement of the main shaft from the one or more measurement signals.

15. The system of claim 14, wherein the environmental or operating conditions comprise at least one of wind speed, wind direction, wind gust, wind shear, temperature, air density, generator speed, rotor speed, power output, or torque.

16. The system of claim 14, wherein removing the effect of the one or more environmental or operating conditions of the rotary machine from the one or more measurement signals over the time period further comprises:
automatically and adaptively learning and eliminating the effect of the environmental or operating conditions on the movement of the rotating shaft from the one or more measurement signals via a machine learning regression model.

17. A system for detecting damage in a main bearing coupled to a main shaft of a wind turbine, the system comprising:
one or more first sensors for monitoring movement of the main shaft in one or more directions;
one or more second sensors for monitoring one or more environmental or operating conditions of the wind turbine; and
a controller communicatively coupled to the one or more first and second sensors, the controller configured to perform a plurality of operations, the plurality of operations comprising:
receiving one or more measurement signals from the one or more first sensors over a time period;
removing an effect of one or more environmental or operating conditions of the wind turbine from the one or more measurement signals over the time period;
analyzing decreases in the one or more measurement signals from the one or more first sensors, wherein decreases in the one or more measurement signals above a predetermined threshold or of a certain magnitude are indicative of a damaged main bearing;
implementing a corrective action when the decreases in the one or more measurement signals are above the predetermined threshold;
wherein removing the effect of the one or more environmental and/or or operating conditions of the rotary machine from the one or more measurement signals over the time period further comprises:
automatically and adaptively learning and eliminating the effect of the environmental or operating conditions of on the movement of the rotating shaft from the one or more measurement signals via a machine learning regression model;
determining a predicted measurement signal of the one or more first sensors via the regression model; and,
subtracting the predicted measurement signal from an original measurement signal of the one or more measurement signals to obtain a corrected measurement signal.

18. The system of claim 17, wherein analyzing the decreases in the one or more measurement signals from the one or more first sensors further comprises comparing the corrected measurement signal to the predetermined threshold or determining whether variations in the corrected measurement signal are of the certain magnitude.

19. A method for detecting damage in a bearing coupled to a rotating shaft of a rotary machine, the method comprising:
receiving one or more measurement signals from one or more first sensors for monitoring movement of the rotating shaft;

during a training period, automatically and adaptively learning an effect of one or more environmental or operating conditions on the movement of the rotating shaft via a machine learning regression model;

during a correction period, automatically and adaptively eliminating the effect of the one or more environmental or operating conditions on the measurement signals of movement of the rotating shaft;

analyzing decreases in the one or more measurement signals after eliminating the effect of the one or more environmental or operating conditions;

implementing a corrective action when the decreases in the one or more measurement signals from the one or more sensors are above a predetermined threshold or are of a certain magnitude; and wherein eliminating the effect of the one or more environmental or operating conditions from the one or more measurement signals further comprises:

determining a predicted measurement signal of the one or more first sensors; and subtracting the predicted measurement signal from an original measurement signal of the one or more measurement signals to obtain a corrected measurement signal.

* * * * *